United States Patent
Nair et al.

(10) Patent No.: US 10,606,338 B2
(45) Date of Patent: Mar. 31, 2020

(54) ENERGY-AWARE POWER SHARING CONTROL

(71) Applicant: Intel Corporation, Santa Clara, CA (US)

(72) Inventors: Sudheer Nair, Portland, OR (US); James G. Hermerding, II, Vancouver, WA (US); Avinash Ananthakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 15/859,265

(22) Filed: Dec. 29, 2017

(65) Prior Publication Data
US 2019/0204900 A1    Jul. 4, 2019

(51) Int. Cl.
| | | |
|---|---|---|
| G06F 1/26 | (2006.01) | |
| G06F 1/32 | (2019.01) | |
| G06F 1/3293 | (2019.01) | |
| G06F 1/3206 | (2019.01) | |
| G06F 1/20 | (2006.01) | |
| G06F 1/3287 | (2019.01) | |

(52) U.S. Cl.
CPC ............ *G06F 1/3293* (2013.01); *G06F 1/206* (2013.01); *G06F 1/26* (2013.01); *G06F 1/3206* (2013.01); *G06F 1/3287* (2013.01)

(58) Field of Classification Search
CPC .................................................. G06F 1/3293
See application file for complete search history.

(56) References Cited

U.S. PATENT DOCUMENTS

| | | |
|---|---|---|
| 8,943,340 B2 | 1/2015 | Ananthakrishnan et al. |
| 2001/0056341 A1 | 12/2001 | Pennello et al. |
| 2005/0172650 A1 | 8/2005 | Hermerding |
| 2005/0246558 A1 | 11/2005 | Ku |
| 2008/0011467 A1 | 1/2008 | Rodarte et al. |

(Continued)

FOREIGN PATENT DOCUMENTS

EP     2840461 A1    2/2015

OTHER PUBLICATIONS

PCT International Search Report and Written Opinion in PCT International Application Serial No. PCT/US2018/065573 dated Apr. 4, 2019.

*Primary Examiner* — Mohammed H Rehman
(74) *Attorney, Agent, or Firm* — Alliance IP, LLC (57) ABSTRACT

Aspects of the embodiments are directed to systems, methods, and program products for rebalancing power in a multi-chip computing platform, which includes a core processor and a discrete peripheral processor. Embodiments include determining that the core processor and the discrete peripheral processor are in a limited usage state; altering a polling interval of the core processor and the discrete peripheral processor from a first polling time to a second polling time, the second polling time greater than the first polling time; and polling the core processor and the discrete peripheral processor after an expiration of the second polling time. Embodiments also include using thermal and/or energy consumption data to dynamically adjust polling times to permit the core processor and the discrete peripheral processor to remain in an idle or low power state for as long as possible.

21 Claims, 4 Drawing Sheets

(56) References Cited

U.S. PATENT DOCUMENTS

| | | | |
|---|---|---|---|
| 2008/0079989 A1* | 4/2008 | Agnetta | G03G 15/55 |
| | | | 358/1.15 |
| 2010/0162014 A1 | 6/2010 | Memon et al. | |
| 2012/0078996 A1* | 3/2012 | Shah | H04L 67/325 |
| | | | 709/203 |
| 2014/0259018 A1* | 9/2014 | Jain | G06F 9/4881 |
| | | | 718/102 |
| 2014/0281235 A1 | 9/2014 | Liu | |
| 2015/0100799 A1 | 4/2015 | Shah et al. | |
| 2015/0100800 A1 | 4/2015 | Shah et al. | |
| 2015/0142350 A1 | 5/2015 | Ebner et al. | |
| 2016/0094410 A1* | 3/2016 | Anwar | H04L 67/1095 |
| | | | 709/223 |
| 2017/0092996 A1 | 3/2017 | Rodriguez et al. | |
| 2017/0285730 A1 | 10/2017 | Min | |
| 2017/0293332 A1 | 10/2017 | Rotem et al. | |
| 2017/0324629 A1* | 11/2017 | Iyer | H04L 43/08 |
| 2017/0351322 A1 | 12/2017 | Uan-Zo-Li et al. | |

* cited by examiner

ENERGY-AWARE POWER SHARING CONTROL

TECHNICAL FIELD

Embodiments described herein generally relate to power management of computing systems.

BACKGROUND

Advances in semiconductor processing and logic design have permitted an increase in the amount of logic that may be present on integrated circuit devices. As a result, computer system configurations have evolved from single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of the disclosed embodiments. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of actions, the order of such actions as presented herein is not necessarily the only order in which such actions may be performed, and certain of the stated actions may possibly be omitted and/or certain other actions not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems such as wearable. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, wearables, IoT devices, to name just a few.

Embodiments may be implemented in terminals such as wearable devices, mobile phones, smartphones and phablets, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are beneficial to achieve a "green technology" future, such as for power conservation and energy efficiency in products that encompass a large portion of the US economy.

A graphics engine can be integrated with central processing cores in the same die, or as part of a multichip platform (MCP), and doing so allows each of the graphics engine and the central processing cores to share a single power budget. On such platforms, power re-balancing between the central processing cores and the graphics engine is performed in the p-code, which includes an algorithm that runs a very tight loop of around one millisecond.

This disclosure describes a multi-chip package that includes an integrated central processing core and graphics engine coupled with a discrete graphics die. Power rebalancing is still desirable on such platforms. If different components (dies) on the package are functionally independent of each have their own autonomous power/energy management apparatus, a mechanism to co-ordinate and control power budget for the collective package must exist external the individual dies. One embodiment of a mechanism to control and co-ordinate power sharing between different components on a package can be done in software. With a software implementation, the bandwidth of the control loop is proportional to the rate of polling employed by the control loop This disclosure describes a power rebalancing mechanism that can be implemented in a software driver. However having such a tight loop continuously running in software could have a detrimental effect; especially the power overhead associated with such a polling loop will impact battery life on predominantly idle scenarios.

This disclosure describes systems, methods, and computer program products to implement a control mechanism that minimizes the power overhead of the control loop. Embodiments also include a scheme where polling frequency (bandwidth) of the control loop can be varied based on how close the SoC is to power or thermal constraints. Aspects of the embodiments include an adaptive polling loop that scales back on the polling cadence based on telemetry information. The telemetry data used in the decision making process involves activity/utilization and power budget information accumulated over a historical running interval.

Similarly it is also important that an appropriate decision is made as to when to scale to a faster polling interval. In this disclosure, this decision is made based on thermal and energy threshold interrupts/events.

This disclosure addresses the idle power impact due to a software implemented control loop (vis-à-vis, the power rebalancing proportional-integral-derivative (PID) controller) being active very often. However, this is not only limited to the case of power re-balancing between the CPU and discrete graphics. This mechanism can be extended to other scenarios where utilization and energy counters can be used to provide activity telemetry. Currently there are no known solutions that attempts to solve this kind of a problem. In that sense this particular invention is a novel one. The addition and usage of a programmable energy interrupt to wake from idleness is novel and is not known to be implemented by any current product. This could have significant benefit by allowing faster and higher percent residency in very low power device C-states to maximize battery life. Though energy interrupts are described, other types of interrupts can also be used within the scope of this disclosure. For example, other types of interrupts can include temperature-based and activity-based interrupts, as well as user-prompted interrupts.

Figure 1:
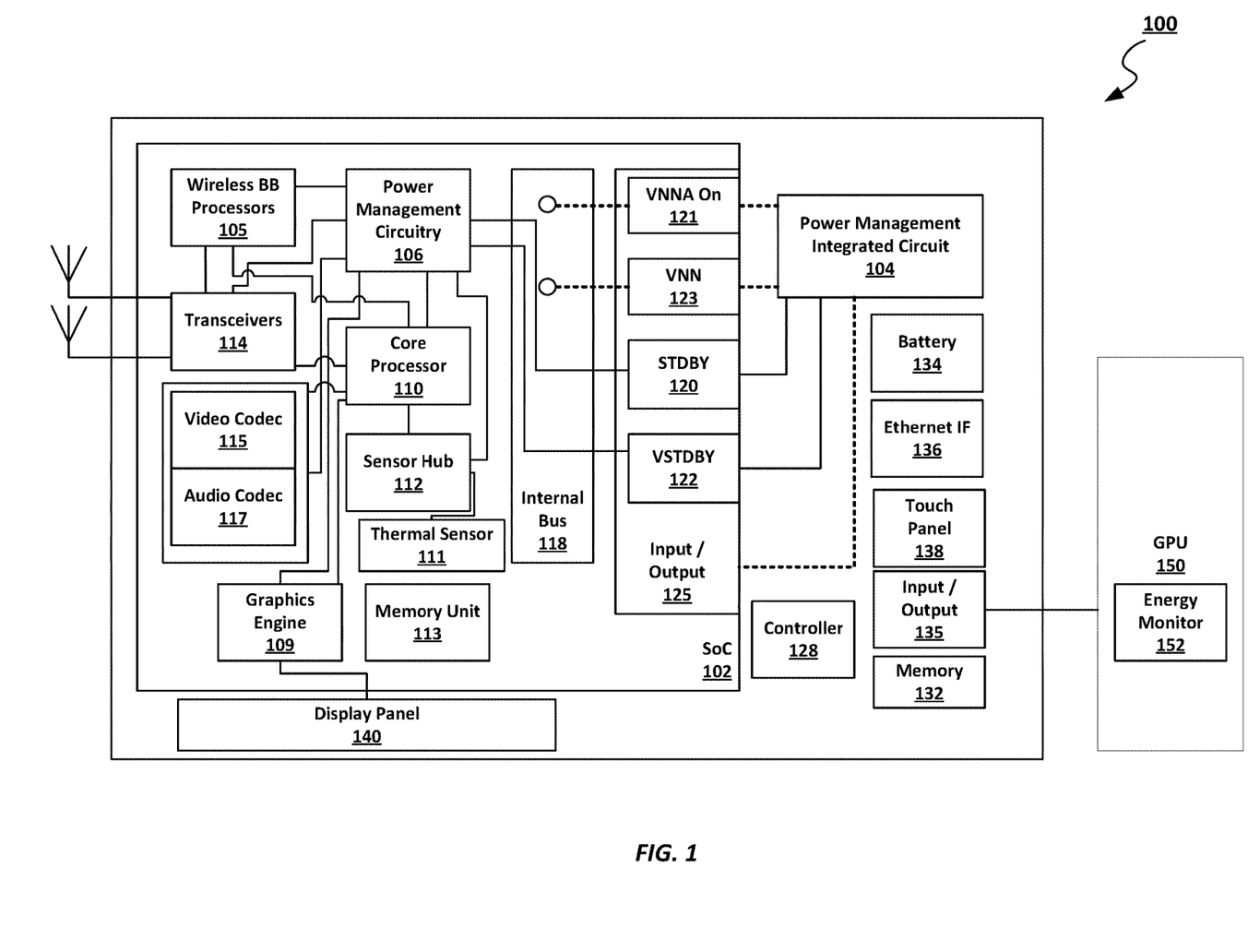
FIG. 1 is a schematic illustration of a hardware device including a SoC coupled to a PMIC according to some demonstrative embodiments.

Referring now to FIG. 1, a block diagram is shown of a computing system 100 and of components present in a computer system in accordance with an embodiment of the present invention is shown. FIG. 1 may be used to implement any of the operations that will be described further below with respect to embodiments, such as exemplary operations described below in relation to FIGS. 2-4.

System 100 may include any combination of components, some of which are shown by way of example in the figure. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 1 is intended to show a high-level view of many components of the computer system. However, it is to be understood that some of the components shown may be omitted, additional components may be present, and different arrangement of the components shown may occur in other implementations.

By way of example, computing system 100 may be a desktop computer, laptop computer, mobile low-power system, a wearable device, a low-power sensor, a tablet computer, a phablet or other convertible or standalone system, a standalone mobile or non-mobile system, etc.

As seen in FIG. 1, a computing system 100, in one embodiment, may include an SoC 102. In general, SoC 102 may integrate a variety of circuit blocks (e.g., intellectual property/IP blocks) including processing circuitries, into a common package, wherein different circuit blocks may perform different functions. The circuit blocks (such as the various blocks of SoC 102), which may be connected to one or more voltage rails (broken lines in FIG. 1) via Power Management Circuitry (PMC) 106 on the SoC via voltage pins VNN 123 (controlled by the PMIC and used to drive an operational power state) and VNNAON 121 (controlled by the PMIC and used to drive a lowered power state, including a retention power state and a low power state), may be independently placed in various power states in order to improve efficiency and/or reduce power consumption. The transitioning of the circuitry blocks within the SoC 102 between various power states may be effected by way of control signals supplied to the circuitry blocks and travelling through control signal paths, shown by way of connecting lines between the circuitry blocks, in FIG. 1. The control signal paths may include I2C signal paths, or other types of control signal paths as would be recognized by one skilled in the art. The various circuitry blocks on computing system 100 may be functionally interconnected/coupled with one another in a known manner.

The circuitry blocks may include a number of processing circuitries, such as a series of wireless baseband processors (BB) 105, one or more transceivers 114 including front-end module circuitry and radio integrated circuits (not shown) coupled to respective ones of the baseband processors, a video encoder/decoder (video codec) 115, an audio encoder/decoder 117, a graphics engine 109, a sensor hub 112, an application processor 110, and PMC 106. Each of the processing circuitries may include a microprocessor, multi-core processor, multithreaded processor, an ultra-low voltage processor, an embedded processor, or other known processing element or circuitry. In the illustrated implementation, SoC 102 may act as a main processing unit and central hub for communication with many of the various components of the computing system 100. Embodiments however are not limited to an SoC, and include within their scope power regulation and management with respect to any set of processing circuitries, whether on an SoC or discrete.

The SoC may further include graphics engine 109 which may render graphics for a display unit 140, such as a liquid crystal display (LCD) or a light emitting diode (LED) display. This display unit 140 may also provide for a touch screen functionality. The display unit 140 may operate in multiple modes. In a first mode, the display unit 140 can be arranged in a transparent state in which the display unit 140 is transparent to visible light. In various embodiments, the majority of the display unit 140 may be a display except for a bezel around the periphery. When the system is operated in a notebook mode and the display unit 140 is operated in a transparent state, a user may view information that is presented on the display unit 140 while also being able to view objects behind the display unit 140. In addition, information displayed on the display unit 140 may be viewed by a user positioned behind the display. Or the operating state of the display unit 140 can be an opaque state in which visible light does not transmit through the display unit 140.

SoC 102 may further include a memory unit 113. SoC may further include one or more flash devices (not shown for sake of simplicity) coupled to one or more of the processors, e.g., via a serial peripheral interface (SPI). Flash devices may provide for non-volatile storage of system software, including a basic input/output software (BIOS) as well as other firmware of the system. Memory unit 113 on SoC 202, and memory 132 on the computing system 100, may each be implemented via multiple memory devices or modules to provide for a given amount of system memory. In one embodiment, one or more of memory unit 113 or memory 132 may be operable in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations, the individual memory devices may be of different package types such as single die package (SDP), dual die package (DDP) or quad die package (QDP). Other memory implementations are possible such as other types of memory modules, e.g., dual inline memory modules (DIMMs) of different varieties including but not limited to microDIMMs, MiniDIMMs. In one embodiment, one or more of memory unit 113 or memory 132 may be sized between 2 GB and 16 GB, and may be configured as a DDR3LM package or an LPDDR2 or LPDDR3 memory. Memory unit 113 may be configured as a mass storage such as a hard disk drive (HDD) or a Solid State Drive (SSD). Memories 113 and 132 may further include a volatile memory.

SoC 102 may further include wireless connectivity circuitry by way of the wireless BB 105, transceivers 114 and antennas 126, each of which can correspond to a particular wireless communication protocol, such as the Near Field Communication (NFC), Wi-Fi, or the Bluetooth (BT) standard. In addition, wireless BB 105, transceiver 114 and antennas 126 may provide wireless wide area communications, e.g., according to a cellular or other wireless wide area protocol.

For perceptual computing and other purposes, various sensors may be present as part of the SoC, as represented by sensor hub 112. Sensor hub 112 may include certain inertial and environmental sensors and their interconnection to application processor 110 and PMC 106 as shown. These sensors may include an accelerometer, an ambient light sensor (ALS), a compass, a gyroscope, and a thermal sensor 111 to name just a few. Using the various inertial and environmental sensors present as part of the SoC or otherwise on computing system 100, many allow the realization of different use cases. These use cases enable advanced computing operations including perceptual computing and also allow for enhancements with regard to power management/battery life, security, and system responsiveness.

For example, the thermal sensor 111 can be used to sense thermal output as part of utilization or other telemetry metrics. The thermal data acquired by the thermal sensor 111 can be used to exit a slow polling mode and to cause the power management software to poll one or both of the core processor 110 and the discrete graphics processing unit (GPU or DGFX) die 150. The thermal data can also be used to determine a polling time. For example, the polling time can be determined based on the thermal data compared against one or more thermal value thresholds, where the larger the thermal threshold met, the faster the polling time.

SoC 102 may further include PMC 106, which may be implemented in hardware, software and/or firmware, and which may be operable to provide voltage regulation and power management within the various circuit blocks of SoC 102. PMC 106 may for example be coupled to STDBY pin 120 and vSTDBY pin 122 to receive and process or forward control signals from the PMIC to transition power states within one or more of the circuit blocks of SoC 102, as will be explained in further detail in relation to FIGS. 2-4.

SoC 102 may further include an internal bus 118 to allow a routing of the control connections shown by way of connecting lines in FIG. 1. The connecting lines depicted in SoC 102 are schematic illustrations of some exemplary control signal paths within the computing system 100, other configurations and further control signal paths being within the knowledge of a skilled person. Control signal paths may include I2C interconnects to carry control signals to and from various processing circuitries.

Various input/output (I/O) devices shown by way of block 125 on the SoC 102, may further be present, including, by way of example, power pins, control pins, and other pins, as would be recognized by one skilled in the art. Among the I/O components of SoC 102, a STDBY pin 120 and a vSTDBY pin 122 are provided among pins to receive and send control signals. For example, STDBY pin 120 and vSTDBY pin 122 may receive control signals from Power Management Integrated Circuit (PMIC) 104 of computing system 100, and may send those control signals onto the PMC 106 of SoC 102 in order to cause a change a power state of the SoC between various possible power states, in manner that will be described further below with respect to some demonstrative embodiments. Although PMIC 104 is shown in FIG. 1 as being external to the SoC 102, embodiments include within their scope the provision of a PMIC or of an on-die regulator with functionality similar to the PMIC on the SoC 102 itself, where the on-die regulator would in this case be regulating the VNN and/or VNNAON from within the SoC 102.

Referring now to the computing system 100, the system may in turn include a number of various circuitry blocks such as, by way of example, PMIC 104, a battery 134 to power the various circuitry blocks, an Ethernet interface 136, a controller 128, a touch panel 138 to provide display capability and user input via touch, including provision of a virtual keyboard on a display of the touch panel. To provide wired network connectivity, computing system 100 may include an Ethernet interface (IF) 136. A peripheral hub within input/output unit 135 may enable interfacing with various peripheral devices, such as may be coupled to computing system 100 by any of various ports or other connectors. Any of the circuit blocks of computing system 100 may be functionally coupled to any of the circuit blocks of SoC 102 in a well-known manner.

Computing system 100 may include, in addition to internal PMC internal to the SoC, functionality within SoC 102 provided by PMC 106, the PMIC 104. PMIC 104 may be coupled to SoC 102 to provide platform-based power management, e.g., based on whether the system is powered by a battery 134 or AC power via an AC adapter (now shown). In addition to this power source-based power management, PMIC 104 may further perform platform power management activities based on environmental and usage conditions. Still further, PMIC 104 may communicate control and status information to SoC 102 to cause various power management actions within SoC 102. PMIC 104 may include hardware, software and/or firmware to perform power management operations with regard to SoC 102 and with respect to other components of the computing system 100. PMIC 104 may provide control signals to control pins on the SoC 102, such as, in the shown embodiment, to STDBY pin 120 and vSTDBY pin 122, along with other possible pins in order to generate the appropriate regulated voltage within various components of the SoC. The PMIC is configured to effect various power state transitions within SoC 102 in order to save power. During power management, while other power planes may be powered down or off when the processor enters certain deep sleep states, the retention power plane may remain powered on to support certain circuit blocks of the SoC, according to some demonstrative embodiments.

It is to be noted that, although FIG. 1 shows connections between various components of computing system 100 in the form of connecting lines, it is to be understood that the control and voltage connections or rails are for the purpose of showing a mere example of possible connections, and may be effected in any way based on the knowledge of the skilled person in order to achieve the advantages of embodiments described herein. In addition, it is to be understood that, although not shown for ease of reference and description, other rails are present within the computing system 100, including other control rails and pins, voltage rails and pins, and other rails and pins, as would be within the knowledge of the skilled person. While not shown for ease of illustration, understand that additional components may be present within computing system 100, such as one or more independent graphics processors, core logic, uncore logic, and other components such as internal memories, e.g., one or more levels of a cache memory hierarchy and so forth. In addition, as suggested previously, power management according to embodiments is not limited to power management within an SoC, but pertains to power management within any computing platform including a number of circuitry blocks.

Each of PMC 106 and PMIC 104 may include one or more function blocks. Each functional block may include circuits to perform various functions, such as a logic unit and a memory core. The memory core may include a volatile memory cell that is continuously supplied with a power supply voltage to retain stored data. In some exemplary embodiments, the memory core may include a static random-access memory (SRAM) cell. In other exemplary embodiments, the memory core may include a dynamic random-access memory (DRAM) cell. Each logic unit may further include a peripheral circuit (not shown) for controlling the memory core.

The computing system 100 also includes a discrete graphics processing unit (GPU) 150. The GPU 150 can be coupled to the SoC 102 by an interconnect, such as an interconnect compatible with a peripheral component interconnect express (PCIe) protocol. The GPU 150 can be coupled to the SoC 102 through the input/output hub 135. The SoC 102 and the GPU 150 can each use the same shared power resources. A power management software can perform power management of the SoC 102 and the GPU 150. The power management software can manage the power budget for each of the SoC 102 and the GPU 150. The power management software can poll the devices to execute power management code. Constant polling of devices, however, can cause the devices to never go into idle state, thereby using power unnecessarily.

This disclosure describes a power sharing algorithm for power balancing between the SoC 102 and the GPU 150 that uses adaptive polling of the devices. This power sharing algorithm is a mechanism by which software (e.g., Dynamic Power and Thermal Framework or DPTF) can control the power to the multi-chip platform (e.g., computing system 100) by dynamically sharing the power between the SoC 102 die and discrete GPU 150 die. This algorithm includes a loop that can run every 100 ms and balances the power between the SoC 102 and discrete GPU 150 die using a PID-based algorithm. The 100 ms timing is an example, and other timings can be used.

Though depicted as a discrete graphics unit, GPU 150 can be any discrete peripheral processor or circuit elements.

In embodiments of the present disclosure, the processing circuitry of the computing system 100, which can include the core processor 110, PMIC 104, and/or power management circuitry 106) can implement various functions either individually or in conjunction with each other to use SoC and/or GPU utilization information, as well as other information, to determine whether to enter into a slow polling mode. The processing circuitry of the computing system 100 can also use thermal information, energy information, and/or other information, to determine whether to exit a slow polling mode or to adjust a polling interval.

In fully active scenarios, the power overhead of the control loop is negligible as the power consumed by the workload is much higher than that of the control loop. The loop interval determines to the first order the duration of a power excursion. The longer the loop interval (100 ms), the larger the latency to respond to any power excursion. In fully active scenarios it is desirable to have the loop interval be as small as possible to limit power excursions. In predominantly idle scenarios, however, where the SoC 102 is running well under the SoC's rated thermal design power (TDP) envelope, the power cost of the control loop may the largest portion of power consumed by the SoC 102. In these scenarios, having a loop constantly running at 100 ms (or other predetermined time intervals) can have detrimental impact battery life. While it is beneficial to scale back the bandwidth of the control loop in idle scenarios, it is also valuable to increase the bandwidth (i.e., polling frequency) when transitioning to a more active state at the SoC 102. This increase in bandwidth is to guarantee that the SoC 102 is being controlled to operate within the SoC's provisioned power and thermal constraints.

Two portions of the algorithm are described below:

Scaling Back on the Polling Based on Telemetry Information.

Figure 2:
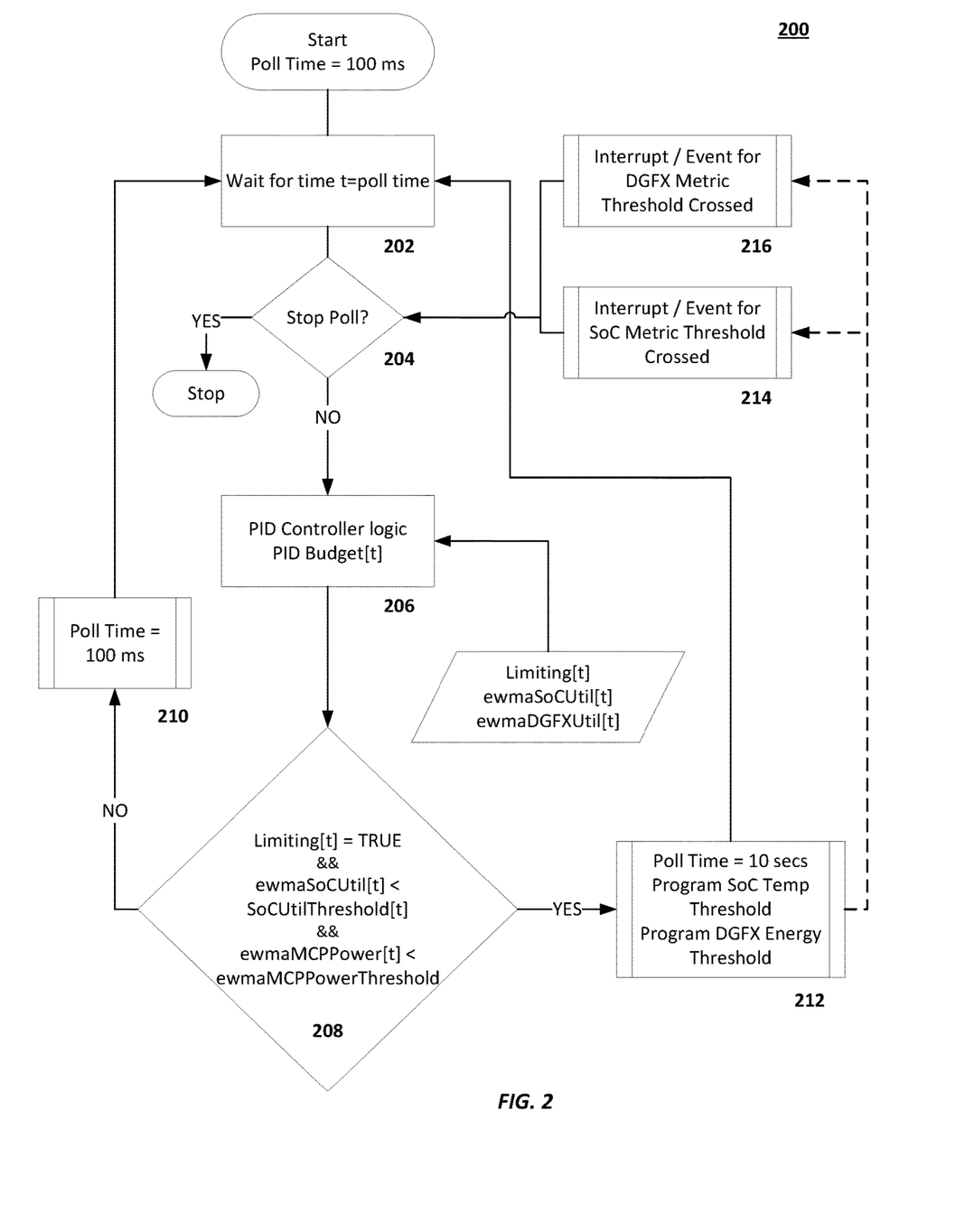
FIG. 2 is a process flow diagram for scaling back on polling based on telemetry information in accordance with embodiments of the present disclosure.

FIG. 2 is a process flow diagram 200 for scaling back on polling based on telemetry information in accordance with embodiments of the present disclosure. The control loop can enter a slow polling mode when the entities in the SoC are sparingly utilized. This slow polling mode is measured in this case by tracking utilization across SoC and GPU components. Utilization is a measure of active state (CO) residency. And as the residency over an evaluation interval drops below a programmed threshold, the control loop can transition into slow polling mode.

At the outset of the flow diagram 200, the power management software can follow a predetermined polling time (e.g., 100 ms or other predetermined amount of time). Assuming that the software will continue to poll (e.g., stop poll? 204 is no), the proportional-integral-derivative (PID) controller logic can receive certain data pertaining to the SoC and GPU utilization (206). In general, the power control software uses information that indicates that the SoC and GPU are in a lower power state, low utilization state, idle state, etc. Such data can include an exponentially weighted moving average (EWMA) of the SoC utilization (ewmaSoCUtil[t]), an EWMA of the GPU utilization (also referred to as discrete graphics (DGFX) utilization) (ewmaDGFXUtil[t]), and whether the SoC and GPU are in a limiting state (limiting[t]).

The ewmaSoCUtil[t] can be defined as follows:

$$\text{ewmaSoCUtil}[t]=\text{poll}\_\alpha*\text{SocUtil}[t]+(1-\text{util}\_\alpha)*\text{ewmaSoCUtil}[t];$$

and the ewmaDGFXUtil[t] can be defined as follows:

$$\text{ewmaDGFXUtil}[t]=\text{poll}\_\alpha]*\text{DGFXUtil}[t]+(1-\text{util}\_\alpha)*\text{ewmaDGFXUtil}[t];$$

where poll_α is a utilization/power weighing factor in the EWMA calculation for deciding to go into a slow polling mode.

The limiting state, or PID Limiting mode (Limiting[t]) alerts the power management software that the control loop is in a limiting mode. The control loop is in a limiting mode if PIDBudget[t]<0 or if the PIDBudget[t] slope is negative (i.e., ewmaPIDBudgetSlope[t]<0).

If the Limiting state is "TRUE," the ewmaSoCUtil[t] is less than a SoCUtilThreshold[t], the ewmaDGFXUtil[t] is less than an ewmaDGFXUtilThreshold[t], and a ewmaMCPPower[t] is less than a MCPPowerThreshold (208), then the power management software can enter a slow poll mode (210). The slow polling mode can be characterized by a t=10 second polling time, for example. But other times can be used depending on implementation choices. The power management software can then enter the slow polling mode, where the wait time for polling is t=10 seconds.

If the power management software determines that the Limiting state is "FALSE," the ewmaSoCUtil[t] is greater than or equal to a SoCUtilThreshold[t], OR the ewmaDGFXUtil[t] is greater than or equal to an ewmaDGFXUtilThreshold[t], and a ewmaMCPPower[t] is greater than or equal to a MCPPowerThreshold (208), then the power management software can remain in a normal poll mode (e.g., polling time=100 ms, 210).

Resuming Fast Poll Based on a Triggering Event

After the power management software enters the slow polling loop (e.g., due to the determination that the SoC and GPU are in a low power/low utilization state), the power management software can use one or more triggering events to determine that SoC/GPU power consumption is large enough or SoC/GPU is active enough for the power management software to increase the bandwidth of the control loop. Though more than two triggering events are contemplated and are well within the scope of the disclosure, two example mechanisms are described below, and in conjunction with FIG. 2:

A first example trigger can be a temperature or thermal threshold. A programmable thermal threshold can be set for the SoC temperature. After the power management software enters a slow polling mode (212), if the SoC temperature crosses the thermal threshold from low to high, the SoC generates an interrupt to the power management software (214). The power management software, upon receiving the thermal interrupt, adjusts the polling loop interval and disables further thermal interrupts from the SoC. More specifically, the power management software uses the data pertaining to the EWMA of the SoC utilization (ewmaSoCUtil[t]), the EWMA of the GPU utilization (also referred to as discrete graphics (DGFX) utilization) (ewmaDGFXUtil[t]), and whether the SoC and GPU are in a limiting state (limiting[t]) to determine the polling time (206, 208).

Power management software can also implement multiple polling intervals as a function of multiple thermal thresholds. For example, a first thermal threshold can cause the polling time to be a first time; while a second thermal threshold greater than the first thermal threshold can cause the polling time to be a second time, less than the first time. More than two thermal thresholds can be used for finer granularity of the dynamic polling time adjustments.

A second example triggering event can involve a programmable energy-based interrupt mechanism, which can involve an assessment of power resource consumption. An energy threshold can be programmed based on how much total energy can be consumed within a time t seconds. Once any of these thresholds are hit and an event is generated, the polling loop starts over at a faster cadence. The following is an example of how energy can be used as a triggering event:

An energy unit can be associated with a portion of an energy metric and an energy counter value: e.g., one Energy Unit=⅛th of Joule (i.e. 1 counter value==⅛). As an example, assuming a current Energy Counter=800, then the current energy consumption is 100 J: 800*⅛=100 J. If the programmed energy threshold is to trigger an event when the power consumption in the next 10 seconds is 20 Watts, then, Energy (J) that would be consumed in 10 secs is 200 J: 20 W*10 s=200 J; and Energy Counter=200(J)*8=1600. So, the counter value of 1600 would indicate an energy consumption of 200 J.

The actual counter value to be programmed is the current counter value increased by the determined counter value: 800+1600=2400 (a counter value of 2400 corresponds to 300 J). Therefore, the SoC and/or GPU can interrupt the slow polling mode when the energy counter corresponds to 300 J. This interrupt could happen in 5 seconds if the average power is 40 W or in 2 seconds if the average power is 100 W. The timing for the slow polling mode is dynamically adjusted based on the average power used (or the thermal values, as described above).

Referring back to FIG. 2, after the power management software enters a slow polling mode (212), if the GPU energy crosses the energy threshold from low to high, the GPU generates an interrupt to the power management software (216). The power management software, upon receiving the energy interrupt, adjusts the polling loop interval and disables further energy interrupts from the GPU. More specifically, the power management software uses the data pertaining to the EWMA of the SoC utilization (ewmaSoCUtil[t]), the EWMA of the GPU utilization (also referred to as discrete graphics (DGFX) utilization) (ewmaDGFXUtil[t]), and whether the SoC and GPU are in a limiting state (limiting[t]) to determine the polling time (206, 208).

Power management software can also implement multiple polling intervals as a function of multiple energy thresholds. For example, a first energy threshold can cause the polling time to be a first time; while a second energy threshold greater than the first energy threshold can cause the polling time to be a second time, less than the first time.

The following is a glossary of terms and equations for reference:

PID Power Budget at time t (PIDBudget[t] is the EWMA accumulator that tracks available power headroom.

PID Target (PIDTarget) is the power target (PL1) that the PID controller is expected to maintain the multichip package (MCP) to. The MCP includes the SoC and the discrete GPU.

PID budget slope EWMA (ewmaPIDBudgetSlope[t] is the EWMA of the PID budget slope:

$$\text{PIDBudgetSlope}[t] = \text{PIDBudget}[t] - \text{PIDBudget}[t-1];$$
$$\text{ewmaPIDBudgetSlope}[t] = \alpha * \text{PIDBudgetSlope}[t] + (1 - \alpha) * \text{ewmaPIDBudgetSlope}[t-1];$$

where a is derived from the averaging interval of the PID controller and the polling interval.

PID Limiting mode (Limiting[t]) indicates whether the control loop is in limiting mode. The control loop can be in limiting mode if PIDBudget[t]<0 or if the PIDBudget[t] slope is negative (i.e., ewmaPIDBudgetSlope[t]<0).

SoC/DGFX utilization EWMA are the exponentially weighted moving average for utilization of the SoC or the discrete graphics die (DGFX). The utilization can be characterized as follows:

$$\text{ewmaSoCUtil}[t] = \text{poll}\_\alpha * \text{SocUtil}[t] + (1 - \text{util}\_\alpha) * \text{ewmaSoCUtil}[t];$$
$$\text{ewmaDGFXUtil}[t] = \text{poll}\_\alpha * \text{DGFXUtil}[t] + (1 - \text{util}\_\alpha) * \text{ewmaDGFXUtil}[t];$$

where poll_α is a utilization/power weighing factor in the EWMA calculation for deciding to go into slow poll.

SoC utilization threshold (SoCUtilThreshold) is a configurable value for the SoC utilization threshold. The EWMA SoC utilization can be compared against this threshold value to determine whether to enter or not enter into the slow poll mode.

DGFX utilization threshold (DGFXUtilThreshold) is a configurable value for the DGFX utilization threshold. The EWMA DGFX utilization is compared against this threshold value to determine whether to enter or not enter into the slow poll mode.

MCP power EWMA (ewmaMCPPower[t]) is the EWMA power for the multichip platform:

$$\text{ewmaMCPPower}[t] = \text{poll}\_\alpha * \text{MCPPower}[t] + (1 - \text{poll}\_\alpha) * \text{ewmaMCPPower}[t].$$

Figure 3:
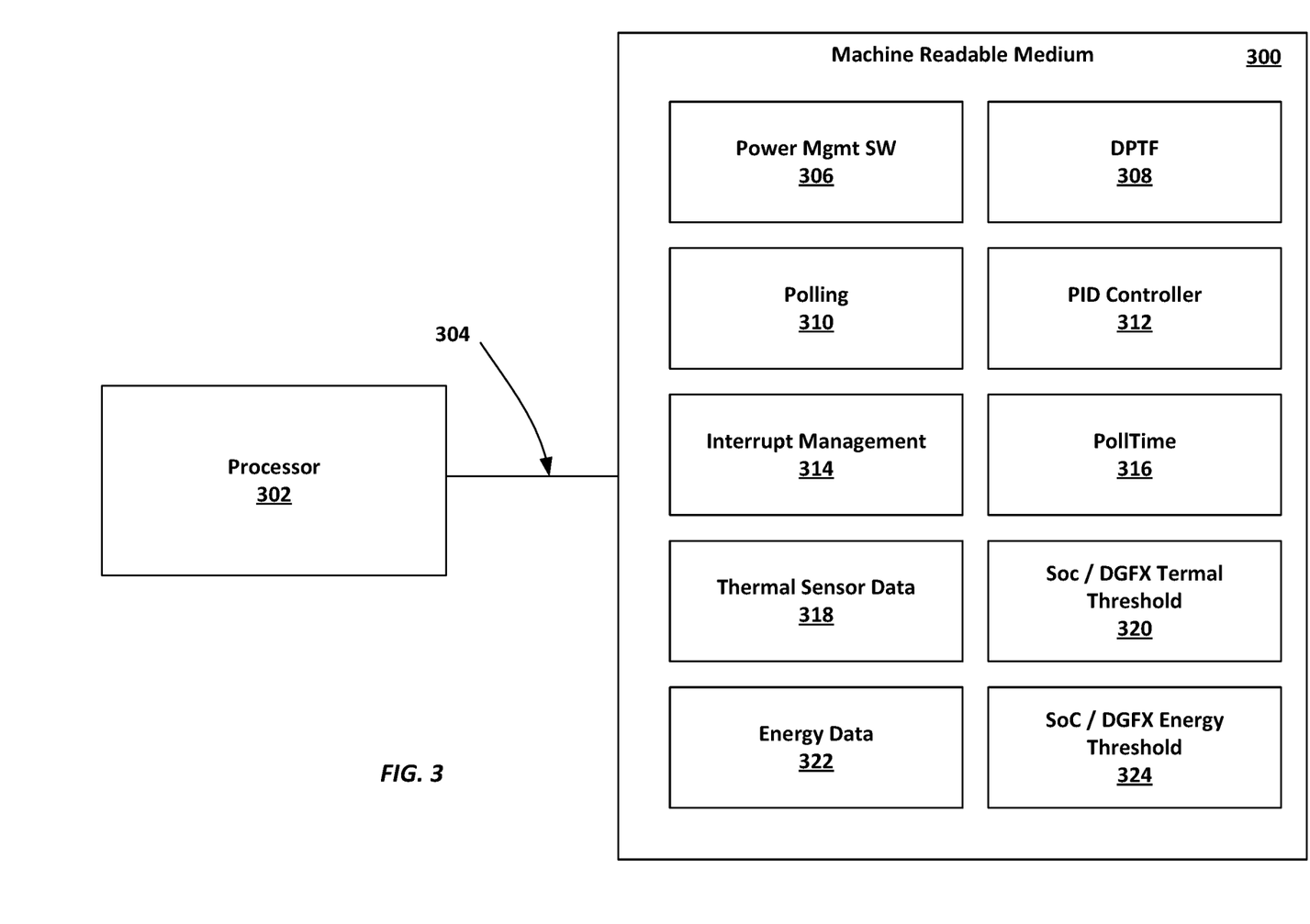
FIG. 3 is a schematic diagram of an example non-transitory machine readable medium that includes a power management software in accordance with embodiments of the present disclosure.

FIG. 3 is a schematic diagram of an example non-transitory machine readable medium 300 that includes a power management software in accordance with embodiments of the present disclosure. The non-transitory machine readable medium 300 is accessible by a processor 302 over a bus 304.

The non-transitory machine readable medium 300 comprises a number of code blocks, computer-executable instructions, and/or data structures used to implement the functionality described herein. These code blocks may include a power management software code block 306 to direct the processor 302 to enter into a slow polling mode based on utilization data, and other data; and to exit a slow polling mode based on one or more triggering events. The non-transitory machine readable medium 300 can also include a Dynamic Platform Thermal Framework (DPTF) 308. The DPTF 308 hosts the actual power sharing policy used between the SoC and the GPU, and also can define the SoC/DGFX thermal threshold 320 and the SoC/DGFX energy threshold 324 values, which are also stored in the non-transitory machine readable medium 300.

The non-transitory machine readable medium 300 can also include a poller 310. The poller 310 can request and receive polling information from the SoC and GPU concerning power resources. The poller 310 performs polling operations based on a polling time 316 set by the power management software 306 in a manner consistent with this disclosure.

The non-transitory machine readable medium 300 can also include a PID controller 312 to provide control loop feedback for determining whether to enter a slow polling mode. The PID controller 312 is also responsible for maintaining the power budget for the SoC and GPU. The PID controller 312 can implement the algorithms described herein, such as that described in FIG. 2. The PID controller 312 can for example contain instructions for power rebalancing as part of the control loop, using utilization information received from the SoC and from the GPU. The PID controller 312 can also use thermal and energy consumption information as triggering events to alter the polling interval for the SoC and GPU.

The non-transitory machine readable medium 300 can also include thermal data 318 received from thermal sensors. The thermal data 318 can be used to determine whether to trigger an event to exit the slow polling mode. Similarly, the energy data 322 can be stored in the non-transitory machine readable medium 300. The energy data 322 can also be used to determine whether to trigger an exit the slow polling mode.

Figure 4:
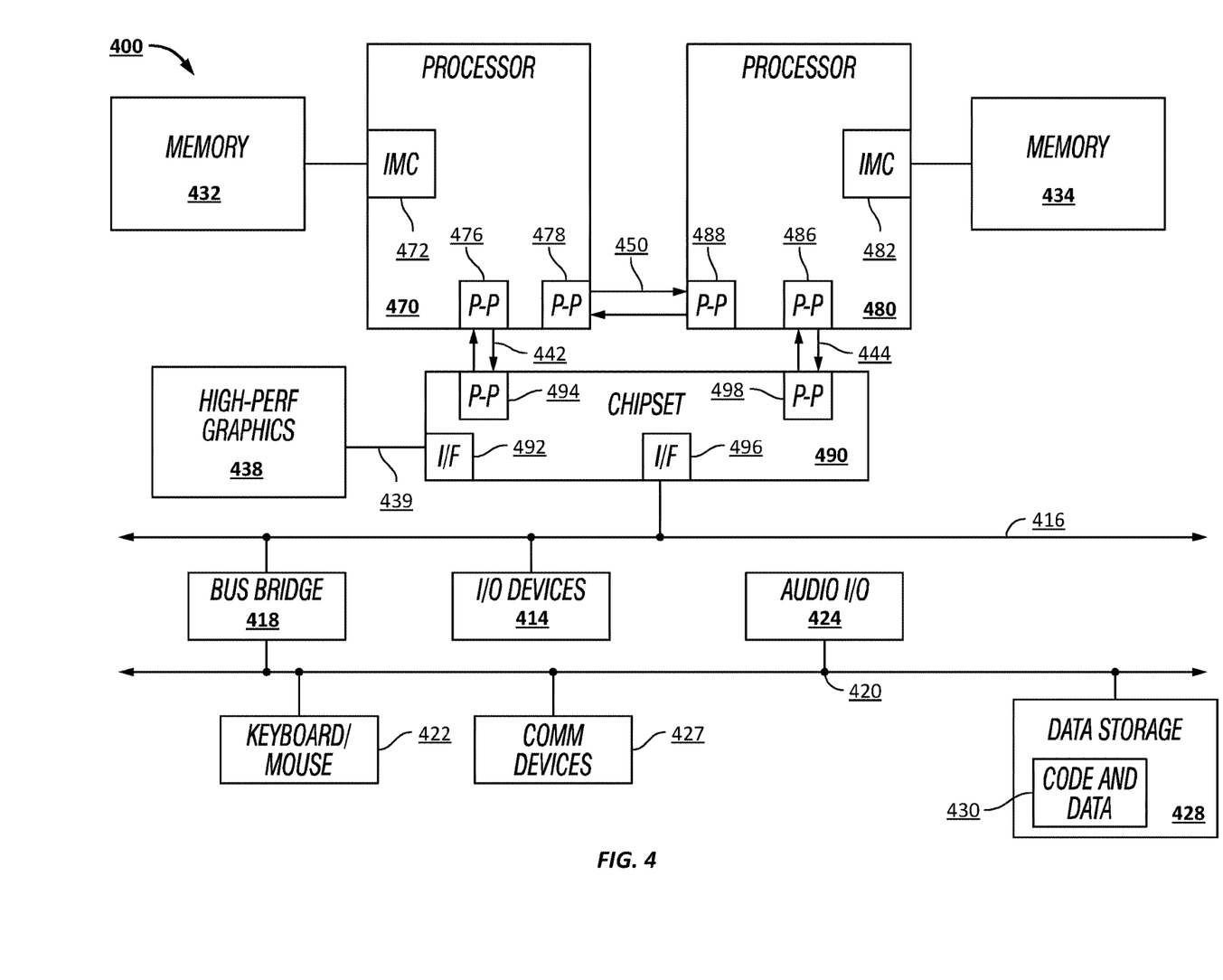
FIG. 4 illustrates an embodiment of a block for a computing system including multiple processor sockets.

Referring now to FIG. 4, shown is a block diagram of a second system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of a processor. In one embodiment, 452 and 454 are part of a serial, point-to-point coherent interconnect fabric, such as Intel's Quick Path Interconnect (QPI) architecture. As a result, the invention may be implemented within the QPI architecture.

While shown with only two processors 470, 480, it is to be understood that the scope of the present invention is not so limited. In other embodiments, one or more additional processors may be present in a given processor.

Processors 470 and 480 are shown including integrated memory controller units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 each exchange information with a chipset 490 via individual P-P interfaces 452, 454 using point to point interface circuits 476, 494, 486, 498. Chipset 490 also exchanges information with a high-performance graphics circuit 438 via an interface circuit 492 along a high-performance graphics interconnect 439.

A shared cache (not shown) may be included in either processor or outside of both processors; yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 are coupled to first bus 416, along with a bus bridge 418 which couples first bus 416 to a second bus 420. In one embodiment, second bus 420 includes a low pin count (LPC) bus. Various devices are coupled to second bus 420 including, for example, a keyboard and/or mouse 422, communication devices 427 and a storage unit 428 such as a disk drive or other mass storage device which often includes instructions/code and data 430, in one embodiment. Further, an audio I/O 424 is shown coupled to second bus 420. Note that other architectures are possible, where the included components and interconnect architectures vary. For example, instead of the point-to-point architecture of FIG. 4, a system may implement a multi-drop bus or other such architecture.

The following examples pertain to further embodiments.

Example 1 is a computer program product comprising one or more tangible computer-readable non-transitory storage media comprising computer-executable instructions operable to, when executed by at least one computer processor, cause the at least one computer processor to implement operations at a multi-chip computing platform that includes a core processor and a discrete peripheral processor, the operations including determining that the core processor and the discrete peripheral processor are in a limited usage state; altering a polling interval of the core processor and the discrete peripheral processor from a first polling time to a second polling time, the second polling time greater than the first polling time; and polling the core processor and the discrete peripheral processor after an expiration of the second polling time.

Example 2 may include the subject matter of example 1, wherein the operation of determining that the core processor and the discrete peripheral processor are in a limited usage state may include determining that the multi-chip platform is in a limited usage mode; determining that a core processor utilization is less than a predetermined threshold utilization value; and determining that a discrete peripheral processor utilization is less than a predetermined threshold value.

Example 3 may include the subject matter of example 2, wherein the operation of determining that the multi-chip platform is in a limited usage mode may include determining that a proportional-integral-derivative (PID) controller budget (PIDBudget[t]) for power headroom of the multi-chip platform is less than zero (PIDBudget[t]<0) or that an exponential weighted moving average (EWMA) of a PID-Budget slope is negative (ewmaPIDBudgetSlope[t]<0).

Example 4 may include the subject matter of 2, wherein the operation of determining that the core processor and the discrete peripheral processor are in a limited usage state may include determining that a multi-chip platform power is less than a threshold power level (ewmaMCPPower[t]<MCP-PowerThreshold).

Example 5 may include the subject matter of any of examples 1-4, the operations can also include measuring a thermal output of one or both of the core processor or the discrete peripheral processor by a thermal sensor; determining that the thermal output is greater than a thermal value level threshold; polling one or both of the core processor or the discrete peripheral processor for power resource consumption; and altering the polling interval to the first polling time.

Example 6 may include the subject matter of example 5, wherein the thermal value level threshold is a first thermal value level threshold; the operations may also include determining that the thermal output is greater than a second thermal value level threshold, the second thermal value level threshold lower than the first thermal value level threshold; polling one or both of the core processor or the discrete peripheral processor for power resource consumption; and altering the polling interval to a third polling time, the third polling time greater than the first polling time and less than the second polling time.

Example 7 may include the subject matter of any of examples 1-4, the operations may also include measuring a power consumption of one or both of the core processor or the discrete peripheral processor; determining that the power consumption is greater than a threshold power consumption value level; polling one or both of the core processor or the discrete peripheral processor for power resource allocation; and altering the polling interval to the first polling time.

Example 8 may include the subject matter of example 7, wherein the operation of determining that the power consumption is greater than a power consumption value level threshold may include associating an energy unit with a counter value and a portion of an energy metric; determining an energy based on a determined power consumption and a power consumption time; determining a counter value for the determined energy; increasing a current counter value with the determined counter value; and correlating the increased counter with an energy metric.

Example 9 may include the subject matter of example 7, wherein the power consumption value level threshold is a first power consumption value level threshold; the operations may also include determining that the power consumption is greater than a second power consumption value level threshold, the second power consumption value level threshold lower than the first power consumption value level threshold; polling one or both of the core processor or the discrete peripheral processor for power resource consumption; and altering the polling interval to a third polling time, the third polling time greater than the first polling time and less than the second polling time.

Example 10 is a multi-chip computing platform that may include processing circuitry; a discrete peripheral processor, such as a discrete graphics processor, and a memory for storing instructions and accessible by the processing circuitry, the processing circuitry to perform the instructions to determine that the core processor and the discrete peripheral processor are in a limited usage state; alter a polling interval of the core processor and the discrete peripheral processor from a first polling time to a second polling time, the second polling time greater than the first polling time; and poll the core processor and the discrete peripheral processor after an expiration of the second polling time.

Example 11 may include the subject matter of example 10, wherein the processing circuitry is further to perform the instructions to determine that the multi-chip platform is in a limited usage mode; determine that a core processor utilization is less than a predetermined threshold utilization value; and determine that a discrete peripheral processor utilization is less than a predetermined threshold value.

Example 12 may include the subject matter of any of examples 10-11, wherein the processing circuitry is further to perform the instructions to measure a thermal output of one or both of the core processor or the discrete peripheral processor by a thermal sensor; determine that the thermal output is greater than a thermal value level threshold; poll one or both of the core processor or the discrete peripheral processor for power resource consumption; and alter the polling interval to the first polling time.

Example 13 may include the subject matter of example 12, wherein the thermal value level threshold is a first thermal value level threshold, wherein the processing circuitry is further to perform the instructions to determine that the thermal is greater than a second thermal value level threshold, the second thermal value level threshold lower than the first thermal value level threshold; and poll one or both of the core processor or the discrete peripheral processor for power resource consumption; and alter the polling interval to a third polling time, the third polling time greater than the first polling time and less than the second polling time.

Example 14 may include the subject matter of any of examples 10-12, wherein the processing circuitry is further to perform the instructions to measure a power consumption of one or both of the core processor or the discrete peripheral processor; determine that the power consumption is greater than a threshold power consumption value level; poll one or both of the core processor or the discrete peripheral processor for power resource allocation; and alter the polling interval to the first polling time.

Example 15 may include the subject matter of example 14, wherein the processing circuitry is further to perform the instructions to associate an energy unit with a counter value and a portion of an energy metric; determine an energy based on a determined power consumption and a power consumption time; determine a counter value for the determined energy; increase a current counter value with the determined counter value; and correlate the increased counter with an energy metric.

Example 16 may include the subject matter of any of examples 10-12 or 14, wherein the processing circuitry includes one or both of a core processor or a power management integrated circuit wherein the discrete peripheral processor comprises a discrete graphics processor; the multi-chip computing platform further including a sensor hub comprising one or more sensors, the one or more sensors comprising a thermal sensor to sense thermal changes in the multi-chip computing platform.

Example 17 is a method for balancing power in a multi-chip platform that includes a core processor and a discrete peripheral processor, the method may include determining that the core processor and the discrete peripheral processor are in a limited usage state; altering a polling interval of the core processor and the discrete peripheral processor from a first polling time to a second polling time, the second polling time greater than the first polling time; and polling the core processor and the discrete peripheral processor after an expiration of the second polling time.

Example 18 may include the subject matter of example 17, wherein determining that the core processor and the discrete peripheral processor are in a limited usage state may include determining that the multi-chip platform is in a limited usage mode; determining that a core processor utilization is less than a predetermined threshold utilization value; and determining that a discrete peripheral processor utilization is less than a predetermined threshold value.

Example 19 may include the subject matter of example 18, wherein determining that the multi-chip platform is in a limited usage mode may include determining that a proportional-integral-derivative (PID) controller budget (PIDBudget[t]) for power headroom of the multi-chip platform is less than zero (PIDBudget[t]<0) or that an exponential weighted moving average (EWMA) of a PIDBudget slope is negative (ewmaPIDBudgetSlope[t]<0).

Example 20 may include the subject matter of example 18, wherein determining that the core processor and the discrete peripheral processor are in a limited usage state may include determining that a multi-chip platform power is less than a threshold power level (ewmaMCPPower[t]<MCP-PowerThreshold).

Example 21 may include the subject matter of example 17, and can also include measuring a thermal output of one or both of the core processor or the discrete peripheral processor by a thermal sensor; determining that the thermal output is greater than a thermal value level threshold; polling one or both of the core processor or the discrete peripheral processor for power resource consumption; and altering the polling interval to the first polling time.

Example 22 may include the subject matter of example 21, wherein the thermal value level threshold is a first thermal value level threshold; the method may also include determining that the thermal output is greater than a second thermal value level threshold, the second thermal value level threshold lower than the first thermal value level threshold; polling one or both of the core processor or the discrete peripheral processor for power resource consumption; and altering the polling interval to a third polling time, the third polling time greater than the first polling time and less than the second polling time.

Example 23 may include the subject matter of example 17, and can also include measuring a power consumption of one or both of the core processor or the discrete peripheral processor; determining that the power consumption is greater than a threshold power consumption value level; polling one or both of the core processor or the discrete peripheral processor for power resource allocation; and altering the polling interval to the first polling time.

Example 24 may include the subject matter of example 23, wherein determining that the power consumption is greater than a power consumption value level threshold may include associating an energy unit with a counter value and a portion of an energy metric; determining an energy based on a determined power consumption and a power consumption time; determining a counter value for the determined energy; increasing a current counter value with the determined counter value; and correlating the increased counter with an energy metric.

Example 25 may include the subject matter of example 23, wherein the power consumption value level threshold is a first power consumption value level threshold; the method can also include determining that the power consumption is greater than a second power consumption value level threshold, the second power consumption value level threshold lower than the first power consumption value level threshold; polling one or both of the core processor or the discrete peripheral processor for power resource consumption; and altering the polling interval to a third polling time, the third polling time greater than the first polling time and less than the second polling time.

Example 26 is a multi-chip computing platform that includes a core processor; a discrete peripheral processor; a memory for storing instructions; and means for determining that the core processor and the discrete peripheral processor are in a limited usage state; means for altering a polling interval of the core processor and the discrete peripheral processor from a first polling time to a second polling time, the second polling time greater than the first polling time; and means for polling the core processor and the discrete peripheral processor after an expiration of the second polling time.

Example 27 may include the subject matter of example 26, and can also include means for determining that the multi-chip platform is in a limited usage mode; means for determining that a core processor utilization is less than a predetermined threshold utilization value; and means for determining that a discrete peripheral processor utilization is less than a predetermined threshold value.

Example 28 may include the subject matter of example 26, and can also include means for measuring a thermal output of one or both of the core processor or the discrete peripheral processor by a thermal sensor; means for determining that the thermal output is greater than a thermal value level threshold; means for polling one or both of the core processor or the discrete peripheral processor for power resource consumption; and means for altering the polling interval to the first polling time.

Example 29 may include the subject matter of example 28, wherein the thermal value level threshold is a first thermal value level threshold; the multi-chip computing platform can also include means for determining that the thermal is greater than a second thermal value level threshold, the second thermal value level threshold lower than the first thermal value level threshold; means for polling one or both of the core processor or the discrete peripheral processor for power resource consumption; and means for altering the polling interval to a third polling time, the third polling time greater than the first polling time and less than the second polling time.

Example 30 may include the subject matter of example 26, and can also include means for measuring a power consumption of one or both of the core processor or the discrete peripheral processor; means for determining that the power consumption is greater than a threshold power consumption value level; means for polling one or both of the core processor or the discrete peripheral processor for power resource allocation; and means for altering the polling interval to the first polling time.

Example 31 may include the subject matter of 30, further comprising means for associating an energy unit with a counter value and a portion of an energy metric; means for determining an energy based on a determined power consumption and a power consumption time; means for determining a counter value for the determined energy; means for incrementing a current counter value with the determined counter value; and means for correlating the incremented counter with an energy metric.

Example 32 may include the subject matter of 26, wherein the discrete peripheral processor comprises a discrete graphics processor die.

Example 33 may include the subject matter of example 26, further comprising a power management integrated circuit.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the techniques. The various appearances of "an embodiment", "one embodiment", or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A computer program product comprising one or more tangible computer-readable non-transitory storage media comprising computer-executable instructions operable to, when executed by at least one computer processor, cause the at least one computer processor to implement operations at a multi-chip computing platform that includes a core processor and a discrete peripheral processor, the operations comprising:

determining that the core processor and the discrete peripheral processor are in a limited usage state;

altering a polling interval of the core processor and the discrete peripheral processor from a first polling time to a second polling time, the second polling time greater than the first polling time; and polling the core processor and the discrete peripheral processor after an expiration of the second polling time;

wherein the operation of determining that the core processor and the discrete peripheral processor are in a limited usage state comprises:

determining that the multi-chip platform is in a limited usage mode;

determining that a core processor utilization is less than a predetermined threshold utilization value; and determining that a discrete peripheral processor utilization is less than a predetermined threshold value wherein the operation of determining that the core processor and the discrete peripheral processor are in a limited usage state comprises determining that a multi-chip platform power is less than a threshold power level (ewmaMCPPower[t]<MCPPowerThreshold).

2. The computer program product of claim 1, wherein the operation of determining that the multi-chip platform is in a limited usage mode comprises:

determining that a proportional-integral-derivative (PID) controller budget (PIDBudget[t]) for power headroom of the multi-chip platform is less than zero (PIDBudget[t]<0) or that an exponential weighted moving average (EWMA) of a PIDBudget slope is negative (ewmaPIDBudgetSlope[t]<0).

3. The computer program product of claim 1, the operations further comprising:

measuring a thermal output of one or both of the core processor or the discrete peripheral processor by a thermal sensor;

determining that the thermal output is greater than a thermal value level threshold;

polling one or both of the core processor or the discrete peripheral processor for power resource consumption; and altering the polling interval to the first polling time.

4. The computer program product of claim 3, wherein the thermal value level threshold is a first thermal value level threshold; the operations further comprising:

determining that the thermal output is greater than a second thermal value level threshold, the second thermal value level threshold lower than the first thermal value level threshold;

polling one or both of the core processor or the discrete peripheral processor for power resource consumption; and altering the polling interval to a third polling time, the third polling time greater than the first polling time and less than the second polling time.

5. The computer program product of claim 1, the operations further comprising:

measuring a power consumption of one or both of the core processor or the discrete peripheral processor;

determining that the power consumption is greater than a threshold power consumption value level;

polling one or both of the core processor or the discrete peripheral processor for power resource allocation; and altering the polling interval to the first polling time.

6. The computer program product of claim 5, wherein the operation of determining that the power consumption is greater than a power consumption value level threshold comprises:

associating an energy unit with a counter value and a portion of an energy metric;

determining an energy based on a determined power consumption and a power consumption time;

determining a counter value for the determined energy;

increasing a current counter value with the determined counter value; and correlating the increased counter with an energy metric.

7. The computer program product of claim 5, wherein the power consumption value level threshold is a first power consumption value level threshold; the operations further comprising:

determining that the power consumption is greater than a second power consumption value level threshold, the second power consumption value level threshold lower than the first power consumption value level threshold;

polling one or both of the core processor or the discrete peripheral processor for power resource consumption; and altering the polling interval to a third polling time, the third polling time greater than the first polling time and less than the second polling time.

8. A multi-chip computing platform comprising:
processing circuitry;
a discrete peripheral processor;
a memory for storing instructions and accessible by the processing circuitry, the processing circuitry to perform the instructions to:

determine that the core processor and the discrete peripheral processor are in a limited usage state;

alter a polling interval of the core processor and the discrete peripheral processor from a first polling time to a second polling time, the second polling time greater than the first polling time; and poll the core processor and the discrete peripheral processor after an expiration of the second polling time;

wherein the processing circuitry is further to perform the instructions to:

determine that the multi-chip platform is in a limited usage mode;

determine that a core processor utilization is less than a predetermined threshold utilization value; and determine that a discrete peripheral processor utilization is less than a predetermined threshold value;

wherein the operation of determining that the core processor and the discrete peripheral processor are in a limited usage state comprises determining that a multi-chip platform power is less than a threshold power level (ewmaMCPPower[t]<MCPPowerThreshold).

9. The multi-chip computing platform of claim 8, wherein the processing circuitry is further to perform the instructions to:

measure a thermal output of one or both of the core processor or the discrete peripheral processor by a thermal sensor;

determine that the thermal output is greater than a thermal value level threshold;

poll one or both of the core processor or the discrete peripheral processor for power resource consumption; and alter the polling interval to the first polling time.

10. The multi-chip computing platform of claim 9, wherein the thermal value level threshold is a first thermal value level threshold, wherein the processing circuitry is further to perform the instructions to:

determine that the thermal is greater than a second thermal value level threshold, the second thermal value level threshold lower than the first thermal value level threshold; poll one or both of the core processor or the discrete peripheral processor for power resource consumption; and alter the polling interval to a third polling time, the third polling time greater than the first polling time and less than the second polling time.

11. The multi-chip computing platform of claim 8, wherein the processing circuitry is further to perform the instructions to:

measure a power consumption of one or both of the core processor or the discrete peripheral processor;

determine that the power consumption is greater than a threshold power consumption value level;

poll one or both of the core processor or the discrete peripheral processor for power resource allocation; and alter the polling interval to the first polling time.

12. The multi-chip computing platform of claim 11, wherein the processing circuitry is further to perform the instructions to:

associate an energy unit with a counter value and a portion of an energy metric;

determine an energy based on a determined power consumption and a power consumption time;

determine a counter value for the determined energy;

increase a current counter value with the determined counter value; and correlate the increased counter with an energy metric.

13. The multi-chip computing platform of claim 8, wherein the processing circuitry comprises one or both of a core processor or a power management integrated circuit.

14. The multi-chip computing platform of claim 13, wherein the discrete peripheral processor comprises a discrete graphics processor; the multi-chip computing platform further comprising:

a sensor hub comprising one or more sensors, the one or more sensors comprising a thermal sensor to sense thermal changes in the multi-chip computing platform.

15. A method to balance power in a multi-chip platform that includes a core processor and a discrete peripheral processor, the method comprising:

determining that the core processor and the discrete peripheral processor are in a limited usage state;

altering a polling interval of the core processor and the discrete peripheral processor from a first polling time to a second polling time, the second polling time greater than the first polling time; and polling the core processor and the discrete peripheral processor after an expiration of the second polling time;

wherein determining that the core processor and the discrete peripheral processor are in a limited usage state comprises determining that a multi-chip platform power is less than a threshold power level (ewmaMCPPower[t]<MCPPowerThreshold).

16. The method of claim 14, wherein determining that the core processor and the discrete peripheral processor are in a limited usage state comprises:

determining that the multi-chip platform is in a limited usage mode;

determining that a core processor utilization is less than a predetermined threshold utilization value; and determining that a discrete peripheral processor utilization is less than a predetermined threshold value.

17. The method of claim 15, wherein determining that the multi-chip platform is in a limited usage mode comprises:

determining that a proportional-integral-derivative (PID) controller budget (PIDBudget[t]) for power headroom of the multi-chip platform is less than zero (PIDBudget[t]<0) or that an exponential weighted moving average (EWMA) of a PIDBudget slope is negative (ewmaPIDBudgetSlope[t]<0).

18. The method of claim 15, further comprising:

measuring a thermal output of one or both of the core processor or the discrete peripheral processor by a thermal sensor;

determining that the thermal output is greater than a thermal value level threshold;

polling one or both of the core processor or the discrete peripheral processor for power resource consumption; and altering the polling interval to the first polling time.

19. The method of claim 18, wherein the thermal value level threshold is a first thermal value level threshold; the method further comprising:

determining that the thermal output is greater than a second thermal value level threshold, the second thermal value level threshold lower than the first thermal value level threshold; and polling one or both of the core processor or the discrete peripheral processor for power resource consumption; and altering the polling interval to a third polling time, the third polling time greater than the first polling time and less than the second polling time.

20. The method of claim 15, further comprising:

measuring a power consumption of one or both of the core processor or the discrete peripheral processor;

determining that the power consumption is greater than a threshold power consumption value level;

polling one or both of the core processor or the discrete peripheral processor for power resource allocation; and altering the polling interval to the first polling time.

21. The method of claim 20, wherein determining that the power consumption is greater than a power consumption value level threshold comprises:

associating an energy unit with a counter value and a portion of an energy metric;

determining an energy based on a determined power consumption and a power consumption time;

determining a counter value for the determined energy;

increasing a current counter value with the determined counter value; and correlating the increased counter with an energy metric.

* * * * *